United States Patent Office 3,755,372
Patented Aug. 28, 1973

3,755,372
ISOFLAVANOID ETHERS
Klaus Irmscher, Josef Kramer, and Hans-Gunther Kraft, Darmstadt, Germany, assignors to Merck Patent Gesellschaft mit beschränkter Haftung, Darmstadt, Germany
No Drawing. Filed Feb. 11, 1971, Ser. No. 114,706
Claims priority, application Germany, Feb. 13, 1970,
P 20 06 505.8
Int. Cl. C07d 7/26
U.S. Cl. 260—345.2                    13 Claims

ABSTRACT OF THE DISCLOSURE

Isoflavanoid ethers of the formula

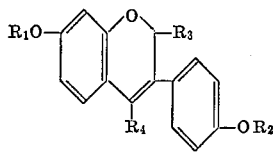

wherein $R_1$ and $R_2$, which can be identical or different, are isopropyl, tert.-butyl, cyclopentyl, or cyclohexyl, $R_3$ and $R_4$, which can be identical or different, are alkyl of 1–4 carbon atoms, possess valuable pharmacological activity, including estrogenic, gonadotropin-inhibiting and anti-fertility activity. They are useful as feed supplements for cattle and poultry to promote growth and weight gain.

BACKGROUND OF THE INVENTION

This invention relates to novel isoflavanoid ethers.

SUMMARY OF THE INVENTION

The isoflavanoid ethers of this invention can be represented by the formula

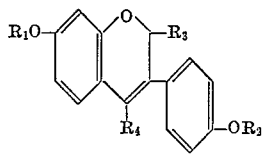

wherein $R_1$ and $R_2$, which can be identical or different, are isopropyl, tert.-butyl, cyclopentyl, or cyclohexyl, and $R_3$ and $R_4$, which can be identical or different, are alkyl of 1–4 carbon atoms.

The compounds of this invention possess valuable pharmacological activity with concomitant good compatibility, for example, estrogenic, gonadotropin-inhibiting and anti-fertility activity. For example, 2-methyl-4-ethyl-7,4'-dicyclopentoxy-3-isoflavene exhibited on parenteral administration of a single dose of 0.05 mg. in rats, a strong estrogenic effect of particularly long duration, according to the method, see Biggers and Claringbold, J. Endocrin., vol. 11, pp. 277–284 (1954).

Accordingly, this invention relates to the use of compounds of Formula I as medicines, especially as depot-estrogens. Another process aspect is directed to their use as feed supplements for animals to promote growth and weight gain. They are also useful as intermediates for the preparation of other drugs.

More specifically, in one process of use aspect, this invention relates to the systemic administration of an amount of a pharmaceutically acceptable composition comprising a compound of this invention effective to achieve at least one of an estrogenic, gonadotropin-inhibiting and anti-fertility effect.

In another process of use aspect, this invention relates to the feeding of animals in which a feed formulation containing an amount of a compound of this invention effective to increase the rate of growth and/or weight gain of the animal is used.

In another process of use aspect, this invention relates to the preparation of the compounds of General Formula I, especially those of General Formulae Ia through Id. In one such process of use aspect, a hydroxyisoflavene of General Formula II

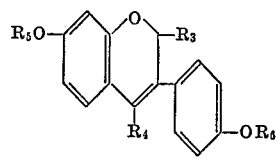

wherein:

$R_1$ through $R_4$ have the values given above,
$R_5$ and $R_6$ are H or $R_2$, at least one of $R_5$ and $R_6$ being H, is reacted with a compound of the General Formula III
wherein:

$R_7$ is $R_1$ or $R_2$, as defined above, and
X is Cl, Br, I or an optionally reactively esterified OH-group.

In another process of use aspect, a compound of the General Formula IV

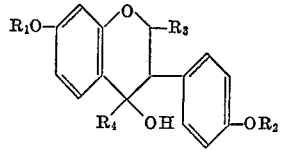

wherein $R_1$ through $R_4$ have the values given above, is treated with a dehydrating agent.

DETAILED DISCUSSION OF THE INVENTION

The preferred compouds of this invention are those of Formula I wherein:

(Ia) $R_3$ and $R_4$ are methyl or ethyl and $R_1$ and $R_2$ have the values given in Formula I;
(Ib) $R_1$ and $R_2$ are cyclopentyl or cyclohexyl and $R_3$ and $R_4$ have the values given in Formula I;
(Ic) $R_1$ and $R_2$ are cyclopentyl or cyclohexyl and $R_3$ and $R_4$ represent methyl or ethyl;
(Id) $R_1$ and $R_2$ are cyclopentyl and $R_3$ and $R_4$ are methyl or ethyl.

In the above formulae, $R_3$ and $R_4$ (independently of each other) preferably are methyl or ethyl. They can, however, also be n-propyl, isopropyl, n-butyl, isobutyl, sec.-butyl, or tert.-butyl.

The term "reactively esterified OH-groups" as used herein means any ester group which will undergo the same reaction as the free hydroxy compound, e.g. a sulfonyloxy ester. Illustrative of such reactively esterified OH-groups are alkylsulfonyloxy, wherein the alkyl group preferably contains 1–6 carbon atoms, arylsulfonyloxy, wherein the aryl group preferably contains 6–12 carbon atoms, e.g. methanesulfonyloxy, benzenesulfonyloxy, p-toluenesulfonyloxy, and 1- and 2-naphthalenesulfonyloxy.

Among the starting hydroxyisoflavenes of Formula II, preferred are the dihydroxy compounds (Formula IIa, $R_5$ and $R_6$ are H and $R_3$ and $R_4$ have the values given in Formula I), for example, 2,4-dimethyl-, 2-methyl-4-ethyl-, 2 - ethyl-4-methyl-, and 2,4-diethyl-7,4'-dihydroxy-3-isoflavene.

The starting compounds of Formula II can be produced, for example, by reacting resorcinol, or the mono-isopropyl, mono-tert.-butyl, monocyclopentyl, or monocyclohexyl ether thereof with p-hydroxybenzyl cyanide or, if the other reactant is resorcinol, with an isopropyl, tert.-butyl, cyclopentyl, or cyclohexyl ether of p-hydroxybenzyl cyanide, to obtain 2,4 - dihydroxyphenyl-1-p-hydroxybenzyl ketone or a mono ether thereof corresponding to the ether of one of the reactants; reacting this product with a fatty acid anhydride of the formula $(R_3CO)_2O$ wherein $R_3$ has the value given for Formula I, to obtain the corresponding 7,4'-diester, 7-ether-4'-ester or 7-ester-4'-ether of 2-$R_3$-7,4'-dihydroxyisoflavone; hydrogenating this compound to the corresponding isoflavanone; reacting the latter with an organometallic compound of the formula $R_4$-Li or $R_4$-MgBr wherein $R_4$ has the value given for Formula I; hydrolyzing or otherwise decomposing the thus-produced organometallic isoflavone; and dehydrating the thus-obtained 7,4'-disubstituted 2-$R_3$-4-$R_4$-4-hydroxyisoflavanes.

Suitable alkylating or cycloalkylating agents of Formula III are, for example, isopropyl bromide, tert.-butyl bromide, cyclopentyl bromide and cyclohexyl bromide, as well as the corresponding alcohols, chlorides, iodides, alkylsulfonates, and arylsulfonates.

The compounds of Formulae II and III can be reacted with each other in stoichiometric quantitative proportions. However, it is more advantageous to employ an excess of the etherification agent III. The etherification can be conducted in the presence of catalysts. When halogenides or sulfonic acid esters are employed as the etherification agents, it is advisable to add a base as catalyst, e.g. an alkali, preferably sodium or potassium hydroxide or sodium or potassium carbonate, or an amine, e.g. pyridine, collidine, or triethylamine, preferably one which can also serve as the solvent. An alkali metal alcoholate, e.g. sodium or potassium methylate, sodium or potassium ethylate, sodium or potassium isopropylate, sodium or potassium tert.-butylate can likewise serve as the base. In this connection, the corresponding alcohol, e.g. methanol, ethanol, isopropyl, and tert.-butanol is suitably employed as an additional solvent. It is also possible to employ other solvents which are inert with respect to the respective catalyst, e.g. hydrocarbons, including benzene, toluene, and xylene, or, particularly when potassium carbonate is added, ketones, e.g. acetone. In an especially advantageous method for the production of the cyclopentyl and cyclohexyl ethers, the free phenol II is first converted into its sodium salt, for example, by reaction with sodium alcoholate (dissolved in the respective alcohol) or with sodium hydride in toluene or xylene, and reacting this sodium salt with a cycloalkyl halogenide, preferably bromide. If desired, the sodium salt of II can be isolated in this procedure and the subsequent reaction with the cycloalkyl halogenide conducted in dimethyl sulfoxide, dimethylformamide, or diethyl acetamide, optionally with the addition of a basic catalyst, e.g. triethylamine or pyridine. The free phenols of Formula II can also be reacted in the presence of an acidic catalyst, e.g. sulfuric acid, phosphoric acid, p-toluenesulfonic acid, with an alcohol of of the formula $R_7$-OH, e.g. isopropanol tert.-butanol, cyclopentanol, cyclohexanol. Suitably, an excess of this alcohol is employed as the solvent in this reaction; however, it is also possible to add an inert solvent, e.g. benzene, toluene, or xylene. The reaction temperatures for the etherification preferably is between 0° C. and the boiling point of the solvent employed, especially between 20 and 160° C. The reaction times are essentially dependent on the type of the etherification agent III and the selected reaction temperature and generally range between 15 minutes and 48 hours. Also, in the etherification step the reactants II and III, respectively, can be employed in situ instead of in the isolated form. Thus, for example, the benzene solution obtained by the reaction of a 2-$R_3$-7,4'-diacyloxyisoflavanone with an alkyl magnesium halide and subsequent hydrolysis and dehydration and containing a compound of Formula II, can be used directly in the reaction with the etherification agent III.

The carbinols of Formula IV can be obtained, for example, by reacting 2-$R_3$-7-$R_1$-O-4'-$R_2$-O-isoflavanones with organometallic compounds of the formula $R_4$-Li or $R_4$-MgBr.

Most suitable as dehydarting agents for splitting off water from the carbinols IV are acids, e.g. dilute mineral acids, such as aqueous sulfuric acid, aqueous hydrochloric acid, or aqueous perchloric acid. Other conventional agents for splitting off water can likewise be employed, e.g. organic carboxylic or sulfonic acids, such as formic acid, acetic acid, benzenesulfonic acid, p-toluenesulfonic acid; acid anhydrides, e.g. acetic anhydride; inorganic or organic acid halogenides, e.g. thionyl chloride, phosphorus oxychloride, methanesulfonyl chloride, p-toluenesulfonyl chloride, or methyl chlorosulfite; and acidic ion exchangers. The dehydration is suitably conducted at temperatures of between 0° C. and boiling temperature, especially between 20 and 120° C. This reaction can be conducted in the presence of an additional inert solvent, e.g. an alcohol, such as methanol or ethanol; an ether, such as diethyl ether, tetrahydrofuran, or dioxane, and is normally terminated after 5 minutes to 48 hours.

The carbinols do not need to be isolated. The carbinols are produced, for example, in situ during the hydrolysis of the reaction product of 2-$R_3$-7-$R_1$-O-4'-$R_2$O-isoflavanones with Grignard compounds $R_4$-MgBr. If the working-up operation of the mixture produced in this reaction is conducted with dilute mineral acids under heating, water is split off from the carbinols and the desired 3-isoflavenes of Formula I are produced.

The novel compounds can be employed in a mixture with solid, liquid and/or semiliquid vehicles as drugs in the human or veterinary medicine. Suitable vehicles are such organic or inorganic substances suitable for parenteral, enteral, or topical application and which do not react with the novel compounds, such as, for example, water, vegetable oils, benzyl alcohols, polyethylene glycols, gelatin, lactose, amylose, magnesium stearate, talc, Vaseline, cholesterol. Especially suitable for parenteral application are solutions, preferably oily or aqueous solutions, as well as suspensions, emulsions, or implants. For enteral application, suitable are tablets, dragées, syrups, juices, or suppositories, and for topical application, salves, creams, or powders. The above-mentioned preparations can optionally be sterilized or mixed with auxiliary agents, such as lubricants, preservatives, stabilizers, or wetting agents, emulsifiers, salts for influencing the osmotic pressure, buffers, coloring, flavoring, and/or aromatous substances.

To achieve an estrogenic effect, the substances are preferably systemically administered in a dosage of 0.01–100 mg. per dosage unit.

The compounds of Formula I can also be employed together with an edible feed, e.g. cracked corn, oats, wheat milo, etc., soybeans, and, in the case of ruminants, alfalfa, hay, etc., and optionally further edible additives, for example, protein additives and/or minerals and/or vitamins for the preparation of a feeding mixture. By administering such a feeding mixture, growth promotion and a greater rate of weight increase of the thus-fed animals is obtained. Such a feed mixture is preferably employed as a feed for pigs and ruminants, for example, cattle, and also with poultry. The content of the feeding mixture of at least one compound of Formula I generally ranges between about 0.000002% and 1.0%, preferably between 0.00005 and 0.008% by weight.

Without further elaboration, it is believed that one skilled in the art can, using the preceding description, utilze the present invention to its fullest extent. The following preferred specific embodiments are, therefore, to be construed as merely illustrative, and not limitative of the remainder of the disclosure in any way whatsoever.

The following preparation of 2-methyl-4-ethyl-7,4'-dihydroxy-3-isoflaven serves as an illustrative example for obtaining a starting material from known compounds:

(a) A solution of 700 g. of resorcinol, 340 g. of 4-hydroxybenzylcyanide and 293 g. of dry $ZnCl_2$ in 5.25 l. of dry ether was saturated with dry HCl gas at 0° C. and was rested over night at room temperature. After decanting the ether phase, the residue was washed two times with ether, 2 l. water were added, the mixture slowly heated to 100° C. and this temperature maintained for two hours. After cooling, the crystals were separated and recrystallized from ethyl acetate, thus obtaining 2,4-dihydroxyphenyl - 4' - hydroxy-benzylketone; M.P. 191–192° C.

(b) A mixture of 534 g. 2,4-dihydroxyphenyl-4'-hydroxy-benzylketone, 5.3 l. acetic anhydride and 2.1 l. tributylamine was refluxed under stirring for seven hours. After resting for another fifteen hours the crystals were separated and recrystallized from ethyl acetate, thus obtaining 2-methyl-7,4'-diacetoxy-isoflavone; M.P. 192° C.

(c) A mixture of 183 g. of 2-methyl-7,4'-diacetoxy-isoflavone, 16 g. of $PtO_2$ and 3.2 l. of acetic acid was hydrogenated, the catalyst separated by filtration and the filtrate evaporated in vacuo. The residue was chromatographed on 2000 g. of silica, thus obtaining 2-methyl-7,4'-diacetoxy-isoflavanone; M.P. 157° C.

(d) To a refluxing solution, prepared from 98 g. of magnesium and 400 g. of ethyl bromide in 750 ml. of ether under nitrogen, 14 g. of 2-methyl-7,4'-diacetoxy-isoflavanone, dissolved in 750 ml. of ethylene glycol dimethylether, were slowly added. After stirring the mixture for two days at room temperature, 1 l. of ice water and 500 ml. of concentrated hydrochloric acid were added. The mixture was extracted with ether, the ether phase neutralized by washing with $H_2O$, dried with $Na_2SO_4$ and the solvent evaporated. After chromatographing the residue on 150 g. silca, 2-methyl-4-ethyl-7,4'-dihydroxy-3-isoflaven was obtained; M.P. 40–60° C.

Example 1

20 g. of sodium is dissolved in 1 l. of methanol; to this solution are added 20 g. of 2-methyl-4-ethyl-7,4'-dihydroxy-3-isoflavene, [M.P. 40–60° C.; obtainable by the reaction of p-hydroxybenzyl cyanide with resorcinol in the presence of $ZnCl_2$ to 2,4 - dihydroxyphenyl - p - hydroxyphenyl-p-hydroxybenzyl ketone (M.P. 191–192° C.), reaction with acetic anhydride/tributylamine to 2-methyl-7,4'-diacetoxyisoflavone (M.P. 192° C.), hydrogenation to 2-methyl-7,4'-diacetoxyisoflavanone (M.P. 157° C.), as well as reaction with $C_2H_5MgBr$ and subsequent hydrolysis, during which dehydration takes place] and 1 l. of bromocyclopentane, and the reaction mixture is refluxed for 3 hours under stirring. Thereafter, the mixture is concentrated, stired into water, and extracted several times with ether. After washing, drying ($Na_2SO_4$), and evaporating the ether extract, the reaction product is chromatographed on silica gel, thus obtaining 2-methyl-4-ethyl-7,4'-dicyclopentoxy-3-isoflavene; M.P. 114° C.

Analogously, by reacting the 7,4'-dihydroxy - 3 - isoflavenes set forth below:

2,4-dimethyl-
2-methyl-4-ethyl-
2-methyl-4-n-propyl-
2-methyl-4-isopropyl-
2-methyl-4-n-butyl-
2-methyl-4-isobutyl-
2-methyl-4-sec.-butyl-
2-methyl-4-tert.-butyl-
2-ethyl-4-methyl-
2,4-diethyl-
2-ethyl-4-n-propyl-
2-ethyl-4-isopropyl-
2-ethyl-4-n-butyl-
2-ethyl-4-isobutyl-
2-ethyl-4-sec.-butyl-
2-ethyl-4-tert.-butyl-
2-n-propyl-4-methyl-
2-n-propyl-4-ethyl-
2,4-di-n-propyl-
2-n-propyl-4-isopropyl-
2-n-propyl-4-n-butyl-
2-n-propyl-4-isobutyl-
2-n-propyl-4-sec.-butyl-
2-n-propyl-4-tert.-butyl-
2-isopropyl-4-methyl-
2-isopropyl-4-ethyl-
2-isopropyl-4-n-propyl-
2,4-diisopropyl-
2-isopropyl-4-n-butyl-
2-isopropyl-4-isobutyl-
2-n-butyl-4-methyl-
2-n-butyl-4-ethyl-
2-n-butyl-4-n-propyl-
2-n-butyl-4-isopropyl-
2,4-di-n-butyl-
2-n-butyl-4-isobutyl-
2-isobutyl-4-methyl-
2-isobutyl-4-ethyl-
2-isobutyl-4-n-propyl-
2-isobutyl-4-isopropyl-
2-isobutyl-4-n-butyl- and
2,4 - diisobutyl-7,4'-dihydroxy-3-isoflavene, with cyclopentyl chloride, bromide, or iodide; cyclohexyl chloride, bromide, or iodide; isopropyl chloride, bromide, or iodide; and tert.-butyl chloride, bromide, or iodide, respectively, the following compounds are obtained:

2,4-dimethyl-7,4'-dicyclopentoxy-3-isoflavene
2,4-dimethyl-7,4'-dicyclohexyloxy-3-isoflavene
2,4-dimethyl-7,4'-diisopropoxy-3-isoflavene
2,4-dimethyl-7,4'-di-tert.-butoxy-3-isoflavene
2-methyl-4-ethyl-7,4'-dicyclopentoxy-3-isoflavene
2-methyl-4-ethyl-7,4'-dicyclohexyloxy-3-isoflavene
2-methyl-4-ethyl-7,4'-diisopropoxy-3-isoflavene
2-methyl-4-ethyl-7,4'-di-tert.-butoxy-3-isoflavene
2-methyl-4-n-propyl-7,4'-dicyclopentoxy-3-isoflavene
2-methyl-4-n-propyl-7,4'-dicyclohexyloxy-3-isoflavene
2-methyl-4-n-propyl-7,4'-diisopropoxy-3-isoflavene
2-methyl-4-n-propyl-7,4'-di-tert.-butoxy-3-isoflavene
2-methyl-4-isopropyl-7,4'-dicyclopentoxy-3-isoflavene
2-methyl-4-isopropyl-7,4'-dicyclohexyloxy-3-isoflavene
2-methyl-4-isopropyl-7,4'-diisopropoxy-3-isoflavene
2-methyl-4-isopropyl-7,4'-di-tert.-butoxy-3-isoflavene
2-methyl-4-n-butyl-7,4'-dicyclopentoxy-3-isoflavene
2-methyl-4-n-butyl-7,4'-dicyclohexyloxy-3-isoflavene
2-methyl-4-n-butyl-7,4'-diisopropoxy-3-isoflavene
2-methyl-4-n-butyl-7,4'-di-tert.-butoxy-3-isoflavene
2-methyl-4-isobutyl-7,4'-dicyclopentoxy-3-isoflavene
2-methyl-4-isobutyl-7,4'-dicyclohexyloxy-3-isoflavene
2-methyl-4-isobutyl-7,4'-diisopropoxy-3-isoflavene
2-methyl-4-isobutyl-7,4'-di-tert.-butoxy-3-isoflavene
2-methyl-4-sec.-butyl-7,4'-dicyclopentoxy-3-isoflavene
2-methyl-4-sec.-butyl-7,4'-dicyclohexyloxy-3-isoflavene
2-methyl-4-sec.-butyl-7,4'-diisopropoxy-3-isoflavene
2-methyl-4-sec.-butyl-7,4'-di-tert.-butoxy-3-isoflavene
2-methyl-4-tert.-butyl-7,4'-dicyclopentoxy-3-isoflavene
2-methyl-4-tert.-butyl-7,4'-dicyclohexyloxy-3-isoflavene
2-methyl-4-tert.-butyl-7,4'-diisopropoxy-3-isoflavene
2-methyl-4-tert.-butyl-7,4'-di-tert.-butoxy-3-isoflavene
2-ethyl-4-methyl-7,4'-dicyclopentoxy-3-isoflavene
2-ethyl-4-methyl-7,4'-dicyclohexyloxy-3-isoflavene
2-ethyl-4-methyl-7,4'-diisopropoxy-3-isoflavene
2-ethyl-4-methyl-7,4'-di-tert.-butoxy-3-isoflavene
2,4-diethyl-7,4'-dicyclopentoxy-3-isoflavene
2,4-diethyl-7,4'-dicyclohexyloxy-3-isoflavene
2,4-diethyl-7,4'-diisopropoxy-3-isoflavene
2,4-diethyl-7,4'-di-tert.-butoxy-3-isoflavene
2-ethyl-4-n-propyl-7,4'-dicyclopentoxy-3-isoflavene
2-ethyl-4-n-propyl-7,4'-dicyclohexyloxy-3-isoflavene
2-ethyl-4-n-propyl-7,4'-diisopropoxy-3-isoflavene
2-ethyl-4-n-propyl-7,4'-di-tert.-butoxy-3-isoflavene
2-ethyl-4-isopropyl-7,4'-dicyclopentoxy-3-isoflavene
2-ethyl-4-isopropyl-7,4'-dicyclohexyloxy-3-isoflavene
2-ethyl-4-isopropyl-7,4'-diisopropoxy-3-isoflavene
2-ethyl-4-isopropyl-7,4'-di-tert-butoxy-3-isoflavene
2-ethyl-4-n-butyl-7,4'-dicyclopentoxy-3-isoflavene
2-ethyl-4-n-butyl-7,4'-dicyclohexyloxy-3-isoflavene
2-ethyl-4-n-butyl-7,4'-diisopropoxy-3-isoflavene
2-ethyl-4-n-butyl-7,4'-di-tert.-butoxy-3-isoflavene 2-ethyl-4-isobutyl-7,4'-dicyclopentoxy-3-isoflavene
2-ethyl-4-isobutyl-7,4'-dicyclohexyloxy-3-isoflavene
2-ethyl-4-isobutyl-7,4'-diisopropoxy-3-isoflavene
2-ethyl-4-isobutyl-7,4'-di-tert.-butoxy-3-isoflavene
2-ethyl-4-sec.-butyl-7,4'-dicyclopentoxy-3-isoflavene
2-ethyl-4-sec.-butyl-7,4'-dicyclohexyloxy-3-isoflavene
2-ethyl-4-sec.-butyl-7,4'-diisoproxy-3-isoflavene
2-ethyl-4-sec.-butyl-7,4'-di-tert.butoxy-3-isoflavene
2-ethyl-4-tert.-butyl-7,4'-dicyclopentoxy-3-isoflavene
2-ethyl-4-tert.-butyl-7,4'-dicyclohexyloxy-3-isoflavene
2-ethyl-4-tert.-butyl-7,4'-diisopropoxy-3-isoflavene
2-ethyl-4-tert.-butyl-7,4'-di-tert.-butoxy-3-isoflavene
2-n-propyl-4-methyl-7,4'-dicyclopentoxy-3-isoflavene
2-n-propyl-4-methyl-7,4'-dicyclohexyloxy-3-isoflavene
2-n-propyl-4-methyl-7,4'-diisopropoxy-3-isoflavene
2-n-propyl-4-methyl-7,4'-di-tert.-butoxy-3-isoflavene
2-n-propyl-4-ethyl-7,4'-dicyclopentoxy-3-isoflavene
2-n-propyl-4-ethyl-7,4'-dicyclohexyloxy-3-isoflavene
2-n-propyl-4-ethyl-7,4'-diisopropoxy-3-isoflavene
2-n-propyl-4-ethyl-7,4'-di-tert.-butoxy-3-isoflavene
2,4-di-n-propyl-7,4'-dicyclopentoxy-3-isoflavene
2,4-di-n-propyl-7,4'-dicyclohexyloxy-3-isoflavene
2,4-di-n-propyl-7,4'-diisopropoxy-3-isoflavene
2,4-di-n-propyl-7,4'-di-tert.-butoxy-3-isoflavene
2-n-propyl-4-isopropyl-7,4'-dicyclopentoxy-3-isoflavene
2-n-propyl-4-isopropyl-7,4'-dicyclohexyloxy-3-isoflavene
2-n-propyl-4-isopropyl-7,4'-diisopropoxy-3-isoflavene
2-n-propyl-4-isopropyl-7,4'-di-tert.-butoxy-3-isoflavene
2-n-propyl-4-n-butyl-7,4'-dicyclopentoxy-3-isoflavene
2-n-propyl-4-n-butyl-7,4'-dicyclohexyloxy-3-isoflavene
2-n-propyl-4-n-butyl-7,4'-diisopropoxy-3-flavene
2-n-propyl-4-n-butyl-7,4'-di-tert.-butoxy-3-isoflavene
2-n-propyl-4-isobutyl-7,4'-dicyclopentoxy-3-isoflavene
2-n-propyl-4-isobutyl-7,4'-dicyclohexyloxy-3-isoflavene
2-n-propyl-4-isobutyl-7,4'-diisopropoxy-3-isoflavene
2-n-propyl-4-isobutyl-7,4'-di-tert.-butoxy-3-isoflavene
2-n-propyl-4-sec.-butyl-7,4'-dicyclopentoxy-3-isoflavene
2-n-propyl-4-sec.-butyl-7,4'-dicyclohexyloxy-3-isoflavene
2-n-propyl-4-sec.-butyl-7,4'-diisopropoxy-3-isoflavene
2-n-propyl-4-sec.-butyl-7,4'-di-tert.-butoxy-3-isoflavene
2-n-propyl-4-tert.-butyl-7,4'-dicyclopentoxy-3-isoflavene
2-n-propyl-4-tert.-butyl-7,4'-dicyclohexyloxy-3-isoflavene
2-n-propyl-4-tert.-butyl-7,4'-diisopropoxy-3-isoflavene
2-n-propyl-4-tert.-butyl-7,4'-di-tert.-butoxy-3-isoflavene
2-isopropyl-4-methyl-7,4'-dicyclopentoxy-3-isoflavene
2-isopropyl-4-methyl-7,4'-dicyclohexyloxy-3-isoflavene
2-isopropyl-4-methyl-7,4'-diisopropoxy-3-isoflavene
2-isopropyl-4-methyl-7,4'-di-tert.-butoxy-3-isoflavene
2-isopropyl-4-ethyl-7,4'-dicyclopentoxy-3-isoflavene
2-isopropyl-4-ethyl-7,4'-dicyclohexyloxy-3-isoflavene
2-isopropyl-4-ethyl-7,4'-diisopropoxy-3-isoflavene
2-isopropyl-4-ethyl-7,4'-di-tert.-butoxy-3-isoflavene
2-isopropyl-4-n-propyl-7,4'-dicyclopentoxy-3-isoflavene
2-isopropyl-4-n-propyl-7,4'-dicyclohexyloxy-3-isoflavene
2-isopropyl-4-n-propyl-7,4'-diisopropoxy-3-isoflavene
2-isopropyl-4-n-propyl-7,4'-di-tert.-butoxy-3-isoflavene
2,4-diisopropyl-7,4'-dicyclopentoxy-3-isoflavene
2,4-diisopropyl-7,4'-dicyclohexyloxy-3-isoflavene
2,4-diisopropyl-7,4'-diisopropoxy-3-isoflavene
2,4-diisopropyl-7,4'-di-tert.-butoxy-3-isoflavene
2-isopropyl-4-n-butyl-7,4'-dicyclopentoxy-3-isoflavene
2-isopropyl-4-n-butyl-7,4'-dicyclohexyloxy-3-isoflavene
2-isopropyl-4-n-butyl-7,4'-diisopropoxy-3-isoflavene
2-isopropyl-4-n-butyl-7,4'-di-tert.-butoxy-3-isoflavene
2-isopropyl-4-isobutyl-7,4'-dicyclopentoxy-3-isoflavene
2-isopropyl-4-isobutyl-7,4'-dicyclohexyloxy-3-isoflavene
2-isopropyl-4-isobutyl-7,4'-diisopropoxy-3-isoflavene
2-isopropyl-4-isobutyl-7,4'-di-tert.-butoxy-3-isoflavene
2-n-butyl-4-methyl-7,4'-dicyclopentoxy-3-isoflavene
2-n-butyl-4-methyl-7,4'-dicyclohexyloxy-3-isoflavene
2-n-butyl-4-methyl-7,4'-diisopropoxy-3-isoflavene
2-n-butyl-4-methyl-7,4'-di-tert.-butoxy-3-isoflavene
2-n-butyl-4-ethyl-7,4'-dicyclopentoxy-3-isoflavene
2-n-butyl-4-ethyl-7,4'-dicyclohexyloxy-3-isoflavene
2-n-butyl-4-ethyl-7,4'-diisopropoxy-3-isoflavene
2-n-butyl-4-ethyl-7,4'-di-tert.-butoxy-3-isoflavene
2-n-butyl-4-n-propyl-7,4'-dicyclopentoxy-3-isoflavene
2-n-butyl-4-n-propyl-7,4'-dicyclohexyloxy-3-isoflavene
2-n-butyl-4-n-propyl-7,4'-diisopropoxy-3-isoflavene
2-n-butyl-4-n-propyl-7,4'-di-tert.-butoxy-3-isoflavene
2-n-butyl-4-isopropyl-7,4'-dicyclopentoxy-3-isoflavene
2-n-butyl-4-isopropyl-7,4'-dicyclohexyloxy-3-isoflavene
2-n-butyl-4-isopropyl-7,4'-diisopropoxy-3-isoflavene
2-n-butyl-4-isopropyl-7,4'-di-tert.-butoxy-3-isoflavene
2,4-di-n-butyl-7,4'-dicyclopentoxy-3-isoflavene
2,4-di-n-butyl-7,4'-dicyclohexyloxy-3-isoflavene
2,4-di-n-butyl-7,4'-diisopropoxy-3-isoflavene
2,4-di-n-butyl-7,4'-di-tert.-butoxy-3-isoflavene
2-n-butyl-4-isobutyl-7,4'-dicyclopentoxy-3-isoflavene
2-n-butyl-4-isobutyl-7,4'-dicyclohexyloxy-3-isoflavene
2-n-butyl-4-isobutyl-7,4'-diisopropoxy-3-isoflavene
2-n-butyl-4-isobutyl-7,4'-di-tert.-butoxy-3-isoflavene
2-isobutyl-4-methyl-7,4'-dicyclopentoxy-3-isoflavene
2-isobutyl-4-methyl-7,4'-dicyclohexyloxy-3-isoflavene
2-isobutyl-4-methyl-7,4'-diisopropoxy-3-isoflavene
2-isobutyl-4-methyl-7,4'-di-tert.-butoxy-3-isoflavene
2-isobutyl-4-ethyl-7,4'-dicyclopentoxy-3-isoflavene
2-isobutyl-4-ethyl-7,4'-dicyclohexyloxy-3-isoflavene
2-isobutyl-4-ethyl-7,4'-diisopropoxy-3-isoflavene
2-isobutyl-4-ethyl-7,4'-di-tert.-butoxy-3-isoflavene
2-isobutyl-4-n-propyl-7,4'-dicyclopentoxy-3-isoflavene
2-isobutyl-4-n-propyl-7,4'-dicyclohexyloxy-3-isoflavene
2-isobutyl-4-n-propyl-7,4'-diisopropoxy-3-isoflavene
2-isobutyl-4-n-propyl-7,4'-di-tert.-butoxy-3-isoflavene
2-isobutyl-4-isopropyl-7,4'-dicyclopentoxy-3-isoflavene
2-isobutyl-4-isopropyl-7,4'-dicyclohexyloxy-3-isoflavene
2-isobutyl-4-isopropyl-7,4'-diisopropoxy-3-isoflavene
2-isobutyl-4-isopropyl-7,4'-di-tert.-butoxy-3-isoflavene
2-isobutyl-4-n-butyl-7,4'-dicyclopentoxy-3-isoflavene
2-isobutyl-4-n-butyl-7,4'-dicyclohexyloxy-3-isoflavene
2-isobutyl-4-n-butyl-7,4'-diisopropoxy-3-isoflavene
2-isobutyl-4-n-butyl-7,4'-di-tert.-butoxy-3-isoflavene
2,4-diisobutyl-7,4'-dicyclopentoxy-3-isoflavene
2,4-diisobutyl-7,4'-dicyclohexyloxy-3-isoflavene
2,4-diisobutyl-7,4'-diisopropoxy-3-isoflavene and
2,4-diisobutyl-7,4'-di-tert.-butoxy-3-isoflavene.

Example 2

Analogously to Example 1, 2,4-dimethyl-7-isopropoxy-4'-hydroxy-3-isoflavene (obtainable by reacting 1 mol of 2,4-dimethyl-7,4'-dihydroxy-3-isoflavene with 1 mol of isopropyl bromide and separating the reaction products by chromatography) is reacted with cyclopentyl bromide, thus obtaining 2,4-dimethyl-7-isopropoxy-4'-cyclopentoxy-3-isoflavene.

Example 3

One grame of 2-methyl-4-ethyl-4-hydroxy-7,4'-dicyclopentoxyisoflavane (obtainable by hydrolyzing 2-methyl-7,4'-diacetoxyisoflavanone to the 7,4'-dihydroxy derivative, reacting same with cyclopentyl bromide to the 2-methyl-7,4'-dicyclopentoxyisoflavanone, and reaction with $C_2H_5Li$) is refluxed for ½ hour with 25 ml. of 5% aqueous-ethanolic hydrochloric acid. After cooling, chloroform and water are added, the mixture is separated, the chloroform layer is washed neutral, evaporated, and the residue is chromatographed on silica gel, thus obtaining 2-methyl - 4 - ethyl-7,4'-dicyclopentoxy-3-isoflavene; M.P. 114° C.

Example 4

Two grams of 2-methyl-7,4'-dicyclopentoxyisoflavanone is dissolved in 100 ml. of absolute benzene and added dropwise to a solution prepared from 0.24 g. of magnesium, 2 g. of ethyl bromide, and 200 ml. of ether. The ether is distilled off, the mixture is boiled for 5 hours, cooled, and 100 ml. of 5% hydrochloric acid is added thereto. The reaction mixture, containing 2-methyl-4-ethyl-4-hydroxy-7,4'-dicyclopentoxyisoflavane, is refluxed for ½ hour and then worked up, thus obtaining 2-methyl-4-ethyl-7,4'-dicyclopentoxy-3-isoflavene, M.P. 114° C.

The following illustrates the use of the compounds of this invention as a feed supplement.

Example A

Weaned eight-week old pigs are fed conventionally for 3½ months with a conventional vitamin, mineral and antibiotic supplemented shucked corn swine feed formulation to which has been added 0.0004 percent by weight of 2-methyl-4-ethyl-7,4'-dicyclopentoxy-3-isoflavene. Their average weight gain at the end of the period is substantially higher than the 200–225 pounds average weight pigs of the same age fed during the same period with the otherwise same feed formulation, which did not contain 2-methyl-4-ethyl-7,4'-dicyclopentoxy-3-isoflavene.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A compound of the formula

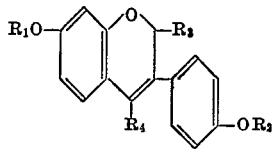

wherein:

$R_1$ and $R_2$ each are isopropyl, tert.-butyl, cyclopentyl or cyclohexyl, and
$R_3$ and $R_4$ are alkyl of 1–4 carbon atoms.

2. A compound of claim 1 wherein $R_3$ and $R_4$ are methyl or ethyl.
3. A compound of claim 1 wherein $R_1$ and $R_2$ are cyclopentyl or cyclohexyl.
4. A compound of claim 3 wherein $R_3$ and $R_4$ are methyl or ethyl.
5. A compound of claim 2 wherein $R_1$ and $R_2$ are cyclopentyl.
6. A compound of claim 1, 2-methyl-4-ethyl-7,4'-dicyclopentoxy-3-isoflavene.
7. A compound of claim 1, 2,4-dimethyl-7,4'-dicyclopentoxy-3-isoflavene.
8. A compound of claim 1, 2-ethyl-4-methyl-7,4'-dicyclopentoxy-3-isoflavene.
9. A compound of claim 1, 2,4-diethyl-7,4'-dicyclopentoxy-3-isoflavene.
10. A compound of claim 1, 2-methyl-4-n-butyl-7,4'-dicyclopentoxy-3-isoflavene.
11. A compound of claim 1, 2-methyl-4-ethyl-7,4'-diisopropoxy-3-isoflavene.
12. A compound of claim 1, 2-methyl-4-ethyl-7,4'-ditert.-butoxy-3-isoflavene.
13. A compound of claim 1, 2-methyl-4-ethyl-7,4'-dicyclohexyloxy-3-isoflavene.

References Cited
UNITED STATES PATENTS

| | | | |
|---|---|---|---|
| 2,675,393 | 4/1954 | Naves | 260—345.2 |
| 3,535,344 | 10/1970 | Irmscher et al. | 260—345.2 |

JOHN M. FORD, Primary Examiner

U.S. Cl. X.R.

424—283